United States Patent [19]

Tilly

[11] Patent Number: 4,553,268
[45] Date of Patent: Nov. 12, 1985

[54] CIRCUIT ARRANGEMENT WITH A LASER DIODE FOR TRANSMISSION OF COMMUNICATION SIGNALS THROUGH A LIGHT WAVEGUIDE

[75] Inventor: Bodo Tilly, Munich, Fed. Rep. of Germany

[73] Assignee: Siemens Aktiengesellschaft, Berlin & Munich, Fed. Rep. of Germany

[21] Appl. No.: 609,525

[22] Filed: May 14, 1984

Related U.S. Application Data

[63] Continuation of Ser. No. 249,653, Mar. 31, 1981, abandoned.

[30] Foreign Application Priority Data

Apr. 8, 1980 [DE] Fed. Rep. of Germany ....... 3013533

[51] Int. Cl.⁴ ............................................. H04B 9/00
[52] U.S. Cl. .................... 455/607; 455/611; 455/612; 455/617
[58] Field of Search .............. 455/601, 602, 606, 608, 455/609, 611, 613, 612, 617, 618, 69, 607; 370/3, 4

[56] References Cited

U.S. PATENT DOCUMENTS

| | | | |
|---|---|---|---|
| 2,967,908 | 1/1961 | Gray et al. ........................ | 455/69 |
| 3,327,216 | 6/1967 | Sichak ............................... | 455/69 |
| 3,410,961 | 11/1968 | Slana ................................ | 455/602 |
| 3,732,496 | 5/1973 | Boyer ............................... | 455/69 |
| 3,943,358 | 3/1976 | Reymond et al. ................ | 455/601 |
| 4,009,385 | 2/1977 | Sell ................................... | 455/618 |
| 4,161,650 | 7/1979 | Caouette et al. ................. | 455/612 |
| 4,247,956 | 1/1981 | Christiansen .................... | 455/606 |
| 4,262,366 | 4/1981 | Eumurian ......................... | 455/612 |
| 4,282,604 | 8/1981 | Jefferson ......................... | 455/602 |
| 4,290,146 | 9/1981 | Adolfsson et al. ............... | 455/612 |
| 4,316,141 | 2/1982 | Adolfsson et al. ............... | 455/617 |

FOREIGN PATENT DOCUMENTS

| | | | |
|---|---|---|---|
| 525304 | 3/1979 | Australia ........................ | 455/612 |
| 2234445 | 1/1974 | Fed. Rep. of Germany . | |
| 2218431 | 12/1977 | Fed. Rep. of Germany . | |
| 2900813 | 7/1979 | Fed. Rep. of Germany . | |
| 2828624 | 1/1980 | Fed. Rep. of Germany . | |
| 52-35905 | 9/1975 | Japan ............................. | 455/607 |
| 657028 | 9/1951 | United Kingdom . | |
| 1535433 | 12/1978 | United Kingdom . | |

OTHER PUBLICATIONS

Campbell—T3 Rate Fiber Optic Terminal—Conf. Intelcon. 79 Expo. Proceding, Dallas TX, Mar. 1979, pp. 177–183.

Ramsay et al.—Optical Fiber Communication—Wireless World, Dec. 1970, pp. 67–70.

Chen—Laser Transmitters For 70 mHZ Entrance Links.

"Nachrichtenubertragung mit Lichtwellenleiter", Telecom Report No. 1, 1978, Heft 1, pp. 34–39 see translation.

"Richtfunktechnik" 1974, pp. 143–159 see translation.

Primary Examiner—Joseph A. Orsino, Jr.
Attorney, Agent, or Firm—Hill, Van Santen, Steadman & Simpson

[57] ABSTRACT

A circuit arrangement for transmission of communication with a laser diode by way of a light waveguide wherein it is desired to reduce the optical transmitted power of the laser diode in order to lengthen its life duration and wherein in a receiving device a control signal is generated and is then fed back to the transmitting device through a return channel to control the output of the laser diode as a function of the received control signal. The invention assures that the optical transmitted power does not overload the laser diode which results in a considerable increase in the operating life time of the laser diode. The circuit arrangement can be used in light waveguide systems for optical communication or data transmission systems.

2 Claims, 5 Drawing Figures

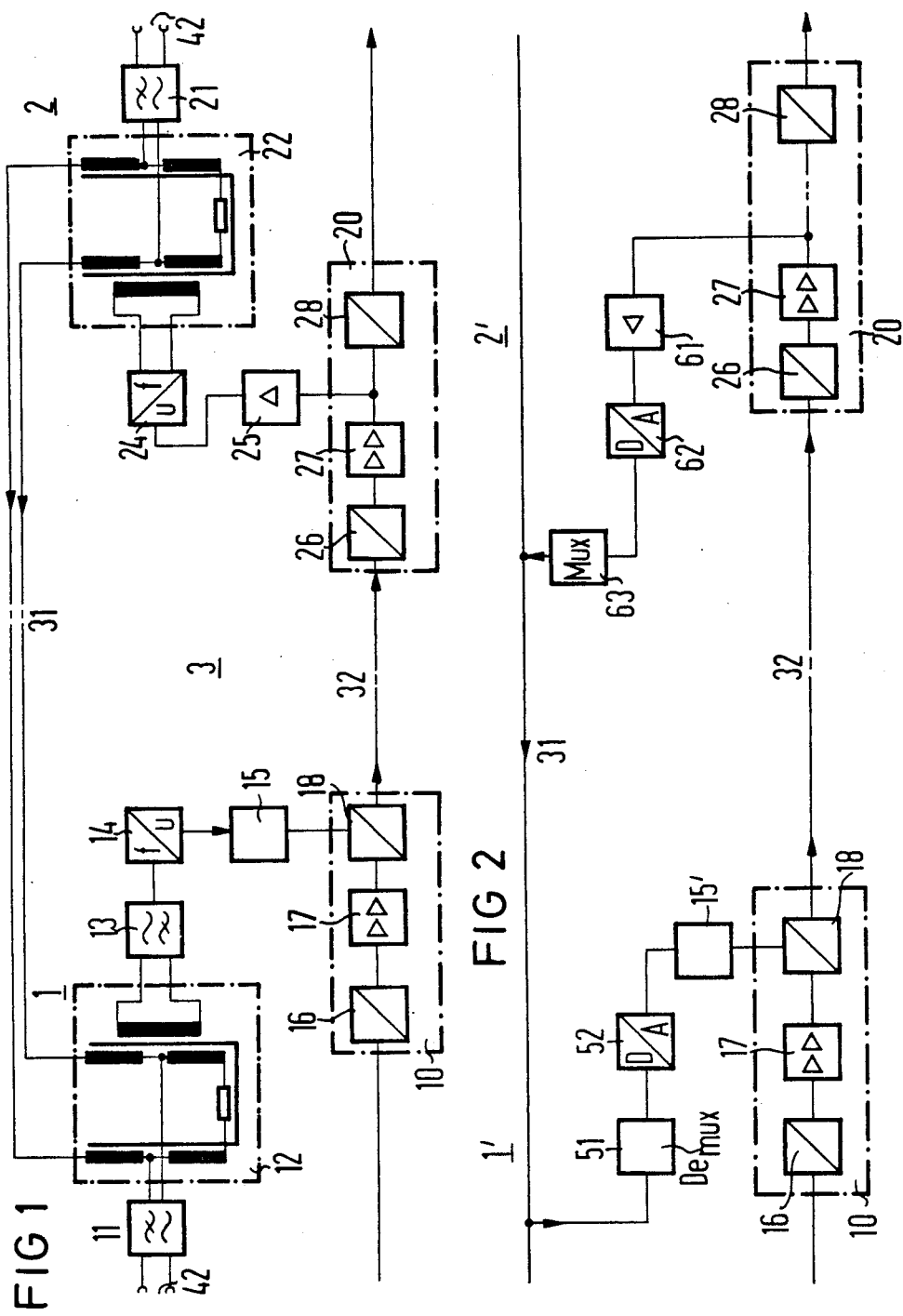

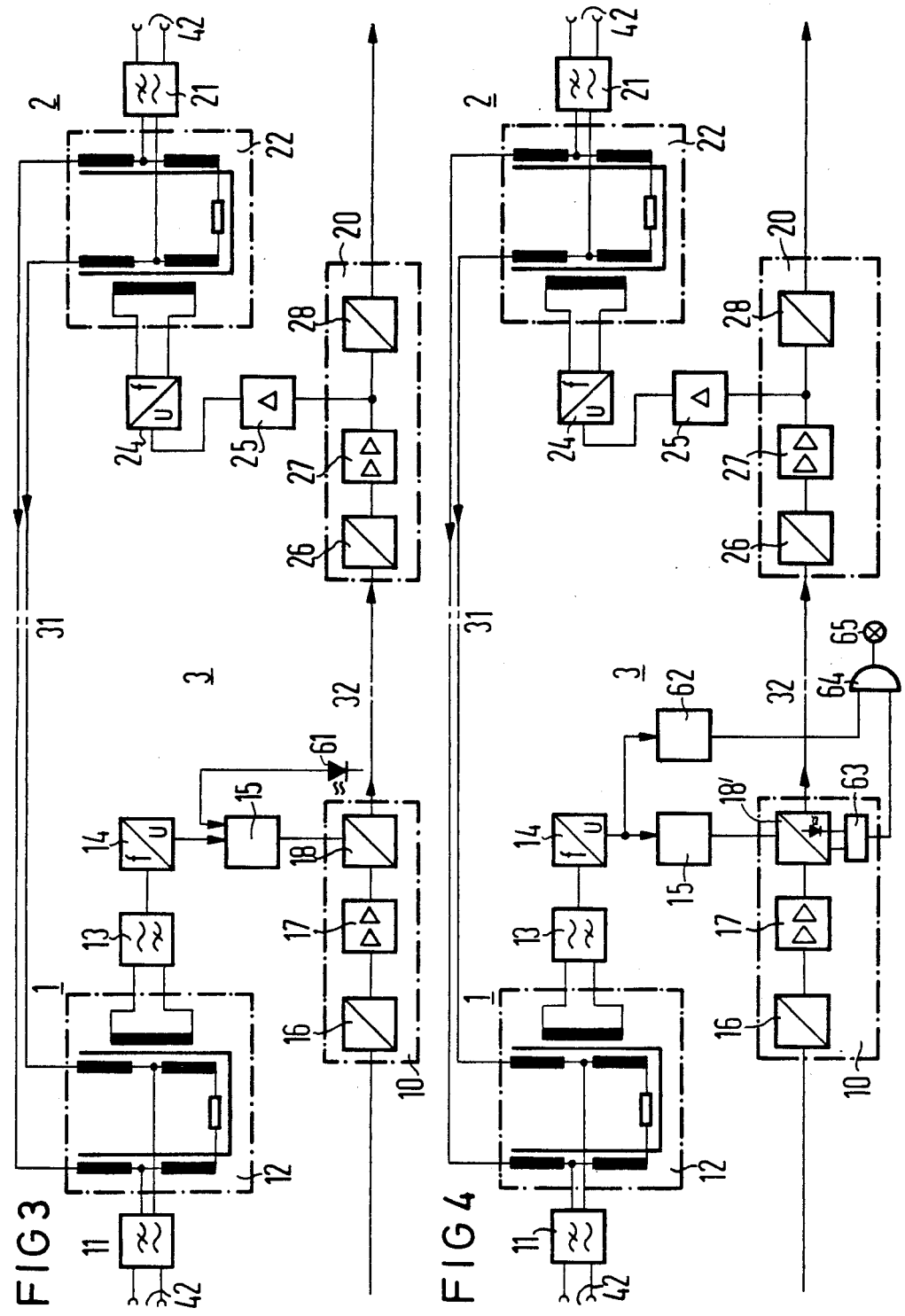

CIRCUIT ARRANGEMENT WITH A LASER DIODE FOR TRANSMISSION OF COMMUNICATION SIGNALS THROUGH A LIGHT WAVEGUIDE

This application is a continuation of application Ser. No. 249,653 filed Mar. 31, 1981, now abandoned.

BACKGROUND OF THE INVENTION

1. Field of the Invention

This invention relates in general to laser diode communication signals by way of light waveguides and in particular to a system for prolonging the life of a laser diode.

In the invention a circuit arrangement is provided with a laser diode for transmitting communication signals through a transmission link which includes a light waveguide and wherein a transmitting device with a modulator which contains the laser diode and a receiving device receives the output of the laser diode through the light waveguide and supplies through a return circuit a control signal to the transmitter to control the optical output power of the laser diode through a regulating device.

2. Description of the Prior Art

A circuit arrangement for transmitting communication signals through a light waveguide is known, for example, in the publication "Nachrichtenubertragung mit Lichtwellenleiter", telecom report, 1 (1978), Vol. 1, pages 34 to 39.

In the known circuit arrangement, a communication signal is supplied as a modulating signal to an electro-optical transducer which consists of a laser diode. The light produced by the electro-optical transducer or from the light source is transmitted through a light waveguide to a light receiver at a receiving location.

The use of a laser diode as the transmitting end light source has the advantage that it can be modulated easily into the gigahertz range and it possesses sufficient light power which can be coupled into the light waveguide and which is for example, 15 to 20 dB higher than luminescence diode. However, a disadvantage results in that shorter life duration of the laser diode results with this system.

Difficulties can arise when the laser diode has a steep gradient characteristic curve which is influenced by temperature and aging. Additional difficulties result from the fact that similar temperature and aging factors occur in the excited laser modes which can be difficult to completely control.

The life duration of a laser diode is dependent upon the quantity of admitted light and, thus, it is desirable to regulate the operating point of the laser diode such that it emits precisely the required amount of light to the light waveguide.

German OS 27 12 293 discloses how to construct laser control circuits such that the optical output energy of a laser is controlled by a relatively slow feedback loop which determines the mean value of the optical output energy of the laser. A voltage derived from the optical output energy is compared with a fixed reference voltage so as to control the forwards current through a differential amplifier.

SUMMARY OF THE INVENTION

The inventor has discovered that the quantity of feedback of the light input coupled into the light conducting fibers for measuring the actual value can be inaccurate. This is because the amount of light need not necessarily be identical to the excited modes in the glass fiber which are actually propagated. Thus, a difference can exist between the actual value measured at the transmitting end and the actual conditions prevailing at the receiving end of the light waveguide. Over short terms this difference could be compensated by introducing a constant gain factor. Long term changes in the mode spectrum of the laser diode which are caused, for example, by temperature changes or by ageing cannot, however, be compensated in this manner.

Known circuit arrangements of the prior art type must therefore provide an additional design feature for the optical transmitted power of the laser diode which determines the life duration of the laser diode. This is also true if the light emitted by a rear reflector or window in the laser diode is used to regulate the optical output power.

It is an object of the present invention to reduce the optical transmitted power of the laser diode so as to increase the life of a laser diode and still maintain satisfactory communication signal transmission.

The object of the invention is realized by providing that in addition to the light waveguide the transmission link between the receiver and transmitter contains a return channel and the receiving device is provided with an analyzing device which analyzes the received communication signal which is characteristic of the optical transmitted power and depending upon the value received forms a control signal which is transmitted through the return channel to the transmitting device and the optical output power of the laser diode at the transmitter is then controlled by the received controlled signal. The light can be transmitted by way of a light waveguide or else directly transmitted. The level of reception at the end of the amplifier section length is used as a measure of the actual value. The characteristic value which is to be regulated to a fixed value and/or the mode of modulation are expediently selected such that the actual value does not change as a result of the modulation of the light emitted from the laser or as a result of the modulating signal.

The optical output power is regulated as known in the prior art in that the forwards current of the laser diode or the amplitude of the modulating signal or modulating current is varied.

The regulation of the forwards current in the event of an unchanging modulating signal is of particular advantage in the case of analog signals or multi-stage signals which are used as the modulating signal. The regulation of the amplitude of the modulation signal in the event of a separate forwards current which in particular is regulated to a value somewhat below the threshold value current or which is maintained constant is particularly advisable in the case of pulse modulation.

These measures result in the advantage that the additional design feature provided for the optical transmitted power does not place an initial burden on the laser diode but serves merely as a regulating reserve so that the life duration of the laser diode will be substantially increased. Also, an advantage is obtained in that the modes which are actually propagated represent the measure of the actual value so that even long term changes in the mode spectrum are not effective to prevent operation of the invention. In addition, the constant reception level achieved substantially simplifies the level regulation in the invention.

Communication transmission devices in which amplifiers can be controlled by changing their gain by way of a return channel from a following amplifier are known. In such prior art devices, only a part of the pilot regulated amplifiers are provided with their own pilot receiver. This saving in pilot receivers is facilitated because a pilot regulator controls the amplification of a number of preceeding amplifiers through a return channel. Such regulation serves to compensate temperature dependent changes in the line attenuation. The actual value which is regulated to a predetermined theoretical value exists at the output of the last regulated amplifier of a group.

It is known that the transmission properties of a light waveguide change only to a slight extent with temperature so that temperature compensation measures such as used with copper cables is not required.

In the circuit according to the invention, the actual value which is regulated to a constant value but which produces a measure of the reception level at the end of the amplifier section length and which exists at a circuit point within the electrical component of the receiving device fulfills the required conditions.

The optical output power can be regulated such that it is determined only by the characteristic value of the received communication signal. This conserves the use of a photodiode for the analysis of the light emerging from the rear window of the laser diode which requires associated temperature compensation means. Particularly the optical output power can be controlled by the control signal such that due to the characteristic value of the received communication signal the mean value or the peak value of the electrical received power can be regulated to a theoretical value. The electrical received power serves as a measure of the power of the received optical signal. However, in contrast, it is also possible to provide a separate indicator for the received optical signal.

The mode of modulation which does not influence the mean value can consist particularly of frequency modulation or pulse phase modulation. The peak value can also be used as the characteristic value.

In a further development of the invention, the optical output power can be controlled depending upon the control signal and also depending upon the optical output signal of the laser diode. In this case, preferably the optical power emitted through a rear window in the laser diode serves as a measure of the optical output signal and the optical output energy which is emitted through a front window. Here a mixed value consisting of the received and the transmitted optical power can be regulated to a constant value.

A yet further development of the invention provides a circuit arrangement designed such that the characteristic value measured at the receiving device is regulated to a constant value within a limited regulation range. The regulation range can be determined by preset limits. Particularly, the forwards current is limited to a value below the laser threshold value current and/or the amplitude of the modulated current is limited to a predetermined value. The laser threshold value current is understood to be the current variation of the laser as it changes from operating as a luminescence diode (luminescence range) to operating as a laser radiator.

On the other hand, it can be particularly expedient to provide that at least the upper limit of the regulation range depends upon a value measured at the transmitting device. This value is preferably the optical power signal emitted from the rear window of the laser diode. For this case, the regulation is preferably effected such that the optical power emitted through the rear window does not overshoot a predetermined value.

Also, the optical power can be limited to a lower limit value so that even in the case of very short links and lengths the laser diode will operate safely within the laser range. This can be maintained in a simple manner since the ratio of the optical power to the current flowing through the laser diode corresponds to a specific value in the laser range on the operating curve.

An additional development of the invention provides that the laser diode can be controlled by the control signal to disconnect it when a predetermined value of the characteristic curve is undershot. In this way, the return channel is advantageously additionally used to increase the operating reliability of the transmission device such that in the case of a faulty transmission link and in particular in the event of an interruption in the light waveguide, the laser will be automatically disconnected.

In yet another development of the invention, the laser diode can be automatically monitored with a control signal received through the return channel and the forwards current can be analyzed by a signalling device such that the overshooting of an upper limit value by the forwards current and the simultaneously undershooting of a predetermined lower limit value by the characteristic value or signal is indicated. This serves to promptly signal threatened breakdown of the laser diode or of the communication link.

Expediently, the regulating device can be selectively set at two theoretical values with the larger which cannot be used until the transmission length has been checked with a set first theoretical value. Particularly, the switchover occurs automatically following the checking of the transmission link.

In this manner, it is possible to assure that the greater transmitting power will not be emitted until a check of the transmission link has indicated that it is reliable.

When a low frequency line is used as the return channel, the control signal expediently consists of a frequency modulated signal in a frequency range above the speech band. In the case of bidirectional transmission system, the return channel preferably represents a component of a communications transmission band of the transmission system corresponding to communication in the opposite direction.

The control signal can also represent a DC voltage or alternating voltage which is superimposed upon an additional signal transmitted in the return channel. When a PCM signal is used as the return channel, the control signal is expediently transmitted in a time slot of the PCM channel. The control signals can also be transmitted with a remote feed circuit.

The return channel can additionally be used for fault location for automatic network monitoring and other similar purposes.

Other objects, features and advantages of the invention will be readily apparent from the following description of certain preferred embodiments thereof taken in conjunction with the accompanying drawings, although variations and modifications may be effected without departing from the spirit and scope of the novel concepts of the disclosure and in which:

BRIEF DESCRIPTION OF THE DRAWINGS

FIG. 1 is a schematic diagram illustrating the invention for transmitting communication signals through a light waveguide using a low frequency line as a return channel;

FIG. 2 is an electrical schematic diagram of a modification of the invention for transmitting communication signals through a light waveguide with a return channel utilizing pulse signals; and FIG. 3 is an electrical schematic illustrating a modification of the invention;

FIG. 4 illustrates a circuit arrangement of a further modification of the invention.

DESCRIPTION OF THE PREFERRED EMBODIMENTS

Figure 5:
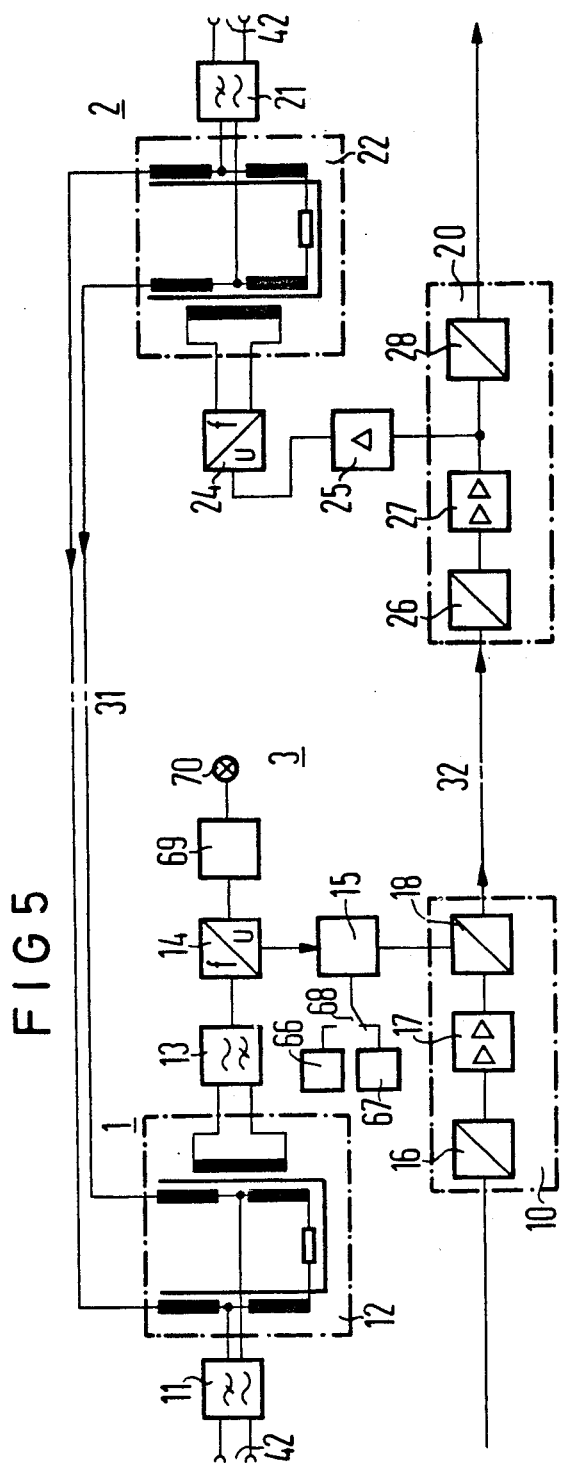
FIG. 5 illustrates another modification of the invention.

FIG. 1 illustrates a transmitting device 10 which includes a laser and modulator 18 which supplies an output to the light waveguide 32 which is connected at the other end to the receiver 20 and has an optical to electrical transducer 26 which converts the optical energy into electrical energy and supplies it to an amplifier 27. The laser diode in the transmitting device 10 can be regulated by a regulating device 15 so as to control its operating point and to control the amount of emitted light therefrom. The regulating device 15 contains a theoretical value generator and produces an output which is proportional to the level of reception of the receiving device 20.

The receiving device 20 includes an optical receiver which amplifies the incoming signal to compensate for the attenuation which occurs over the preceding light wave amplifier section and forwards such signal to the transmission section through the output laser and modulator 28. The light waveguide 32 is connected to the optical to electrical transducer 26 and the light receiver is formed by a silicon photo-diode preferably an avalanche or PIN photo-diode.

A multi-stage amplifier 25 receives a part of the output of the amplifier 27 at the receiver 20 and the output of the amplifier 25 is proportional to the communication signal level which is received by the receiving device 20. The reference value at the receiver is the value at the output of the amplifier 27.

The actual value determined by the amplifier 25 is supplied through an additional return channel from the receiving channel 20 to the transmitting device regulating means 15. A low frequency line 31 provides the return channel for this purpose and it can simultaneously be used as a service line. The actual value at the receiver occurring at the output of the amplifier 27 is amplified by the amplifier 25 and is rectified. A frequency modulator 24 receives the DC voltage from the amplifier rectifier 25 and converts it into a frequency modulated form by way of the LF line 31. The frequency modulated signal is in the upper range of the LF channel above the speech band so that the speech channel which is used can additionally transmit a service conversation. A hybrid transformer 22 receives the output of the frequency modulator 24 and also is coupled to the subscriber apparatus 42 through a low pass filter 21. The lines 31 are connected to the hybrid transformer 22.

In the transmitting device, a hybrid transformer 12 is connected to the LF line 31 and is also connected to the subscriber apparatus 42 through the low-pass filter 11 as well as to a low-pass filter 13 which is connected to a demodulator 14. The output of the demodulator 14 is connected to the regulating device 15 which controls the laser and modulator 18.

Thus, in the apparatus of FIG. 1, the received signal at the output of the amplifier 27 is detected and fed back to the transmitter through the line 31 where it controls the regulating device 15 so as to assure that the output of the laser and modulator 18 will have a level so as to obtain the desired level which is to be maintained at the output of the amplifier 27 in the receiver.

FIG. 2 illustrates a modification of the invention where elements 10 and 20 are illustrated and the regulation of the laser diode is effected with a regulating device 15' as determined by the output of the amplifier 27 of the receiver. However, the feedback path for control comprises a pulse system rather than the system illustrated in FIG. 1. The output of the amplifier 27 is fed to a further amplifier 61 which supplies an output to the analog to digital converter 62 which in turn supplies an input to the multiplex device 63. The output of the multiplex device 63 is connected to the transmitting device 1' through line 31 in a time slot for the relevant amplifier section length. A demultiplexer 51 receives the output of the multiplexer 31 from the line 31 and supplies a digital output signal to the digital to analog converter 52 which produces an analog output signal for controlling the regulating device 15' which controls the output of the laser 18 in the transmitter 10.

In a transmission device comprising a plurality of amplifier sections it is expedient that each amplifier section be regulated independent relative to its reception level.

FIG. 3 comprises a modification of the embodiment illustrated in FIG. 1 wherein a light receiving diode 61 is mounted so as to receive and produce an electrical output proportional to the output of the laser diode 18. The output of the detector 61 is supplied to the regulating device 15 such that the output of the detector 61 as well as the output of the demodulator 14 control the level of the laser 18. The other components of the circuitry of FIG. 3 are the same as those in FIG. 1 and reference may be made to the description of FIG. 1 for such common components.

FIG. 4 illustrates a circuit arrangement which comprises a modification of the circuit of FIG. 1 wherein the output of the demodulator 14 is also supplied to a threshold switch 62 which changes condition when the output of the demodulator 14 falls below a lower limiting value. The output of the laser 18' is supplied to a threshold switch 63 such that when the output of the laser exceeds an upper limiting value an output is supplied to the AND gate 64. The output of the threshold switch 62 is also supplied to the AND gate 64. A display device 65 is attached to the gate 64 and indicates when the upper threshold is exceeded by the output of the laser 18' and the lower limit has been reached by the output of the demodulator 14. The other elements in FIG. 4 are the same as those elements illustrated in FIG. 1 and are not further described.

FIG. 5 illustrates a further embodiment of the invention wherein the circuit of FIG. 1 is modified by providing two generators 66 and 67 which have adjustable outputs and which are connected to terminals of a changeover switch 68 which can selectively be moved to supply either the output of the generators 66 or 67 to the regulating device 15 to control its output.

The circuit arrangement of FIG. 5 makes it possible that the greater of two rated values be enabled only when the transmission path has been checked and it has been determined that the optical waveguide has continuity and the greater of the two values cannot be reached until the transmission line has been checked. If the test device 69 with display element 70 indicates that the transmission path is intact, than the greater of the two nominal values will be connected to the regulator 15.

Although the invention has been described with respect to preferred embodiments, it is not to be so limited as changes and modifications can be made which are within the full intended scope of the invention as defined by the appended claims.

I claim as my invention:

1. A circuit arrangement with a laser diode for the transmission of communications signals through a transmission link comprising a light waveguide, a transmitting device, a modulator in said transmitter, said laser diode in said modulator and connected to one end of said light waveguide, a receiving device connected to the second end of said light waveguide, a regulating device connected to said laser diode for controlling the optical output power, a return channel connected between said transmitting device and said receiving device, an analysis device in said receiving device which analyses the mean value or the peak value of the received communication signal which is characteristic of the optical transmitted power, and depending upon the characteristic value forms a control signal, means for transmitting said control signal through said return channel to said transmitting device from said receiving device, and said regulating device receiving said control signal to control the optical output power of the laser diode as a function of the received control signal, and characterized in that a signalling device is provided for analyzing both the control signal received by way of the return channel and the bias current of the laser including first means for producing an output when said return signal is less than a preset limit and second means for producing an output when said laser exceeds a predetermined limit, gate means connected to said first and second means, and an indicator connected to said gate means.

2. A circuit arrangement as claimed in claim 1, characterized in that for the purpose of increasing the operating safety said regulating device controls the laser diode with the control signal so as to disconnect said laser diode in the event that a predetermined value of the characteristic value rectified communication signals is undershot.

* * * * *